(12) United States Patent
Journade et al.

(10) Patent No.: US 11,254,437 B2
(45) Date of Patent: Feb. 22, 2022

(54) AIRCRAFT ENGINE ASSEMBLY

(71) Applicant: AIRBUS OPERATIONS SAS, Toulouse (FR)

(72) Inventors: Frederic Journade, Toulouse (FR); Eric Bouchet, Aussonne (FR); Olivier Barbara, Puylaurens (FR); Pascal Pome, Cepet (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 460 days.

(21) Appl. No.: 16/150,991

(22) Filed: Oct. 3, 2018

(65) Prior Publication Data

US 2019/0100324 A1 Apr. 4, 2019

(30) Foreign Application Priority Data

Oct. 3, 2017 (FR) ...................................... 1759248

(51) Int. Cl.
*B64D 27/26* (2006.01)
*B64D 27/18* (2006.01)

(52) U.S. Cl.
CPC ............. *B64D 27/26* (2013.01); *B64D 27/18* (2013.01); *B64D 2027/268* (2013.01)

(58) Field of Classification Search
CPC ........... B64D 27/26; B64D 27/18; F02C 7/20; B64C 27/12; B64C 2027/262; B64C 2027/268
See application file for complete search history.

(56) References Cited

U.S. PATENT DOCUMENTS

| | | | |
|---|---|---|---|
| 5,197,692 A * | 3/1993 | Jones ..................... | B64D 27/18 188/320 |
| 5,551,650 A * | 9/1996 | Southward .............. | F16F 13/08 244/54 |
| 7,159,819 B2 * | 1/2007 | Machado ............... | B64D 27/12 244/54 |

(Continued)

FOREIGN PATENT DOCUMENTS

| | | |
|---|---|---|
| EP | 2025898 A2 | 2/2009 |
| EP | 2639159 A2 | 9/2013 |

(Continued)

OTHER PUBLICATIONS

French Search Report; priority document.

*Primary Examiner* — Medhat Badawi
*Assistant Examiner* — Vicente Rodriguez
(74) *Attorney, Agent, or Firm* — Greer, Burns & Crain, Ltd.

(57) ABSTRACT

An aircraft engine assembly has a front engine mount connecting an engine and a primary structure of a pylon comprising at least one front rod having at least three front link points. A first front link point is configured to connect the front rod and the front end of the primary structure. A second front link point is configured to connect the front rod and the core of the engine. A third front link point is configured to connect the front rod and the engine core and is offset relative to the second front link point in a horizontal transverse direction. The first front link point of the front engine mount is separated from the rotation axis of the engine by a distance greater than an exterior radius of the rear casing of the core of the engine at the rear link point of the rear engine mount.

6 Claims, 3 Drawing Sheets

(56) References Cited

U.S. PATENT DOCUMENTS

| | | | |
|---|---|---|---|
| 7,971,826 B2* | 7/2011 | Journade | F01D 25/24 |
| | | | 244/54 |
| 9,611,046 B1* | 4/2017 | Takeuchi | B64D 27/18 |
| 10,562,640 B2* | 2/2020 | Tesniere | F01D 25/28 |
| 2008/0073460 A1* | 3/2008 | Beardsley | F02C 7/20 |
| | | | 244/54 |
| 2009/0056343 A1 | 3/2009 | Suciu et al. | |
| 2011/0127369 A1* | 6/2011 | Dussol | B64D 27/26 |
| | | | 244/54 |
| 2013/0240666 A1 | 9/2013 | Schnelz | |
| 2017/0043878 A1 | 2/2017 | Pautis et al. | |
| 2017/0057652 A1 | 3/2017 | Journade et al. | |

FOREIGN PATENT DOCUMENTS

| | | |
|---|---|---|
| FR | 2963320 A1 | 2/2012 |
| FR | 3040076 A1 | 2/2017 |
| FR | 3040369 A1 | 3/2017 |

\* cited by examiner

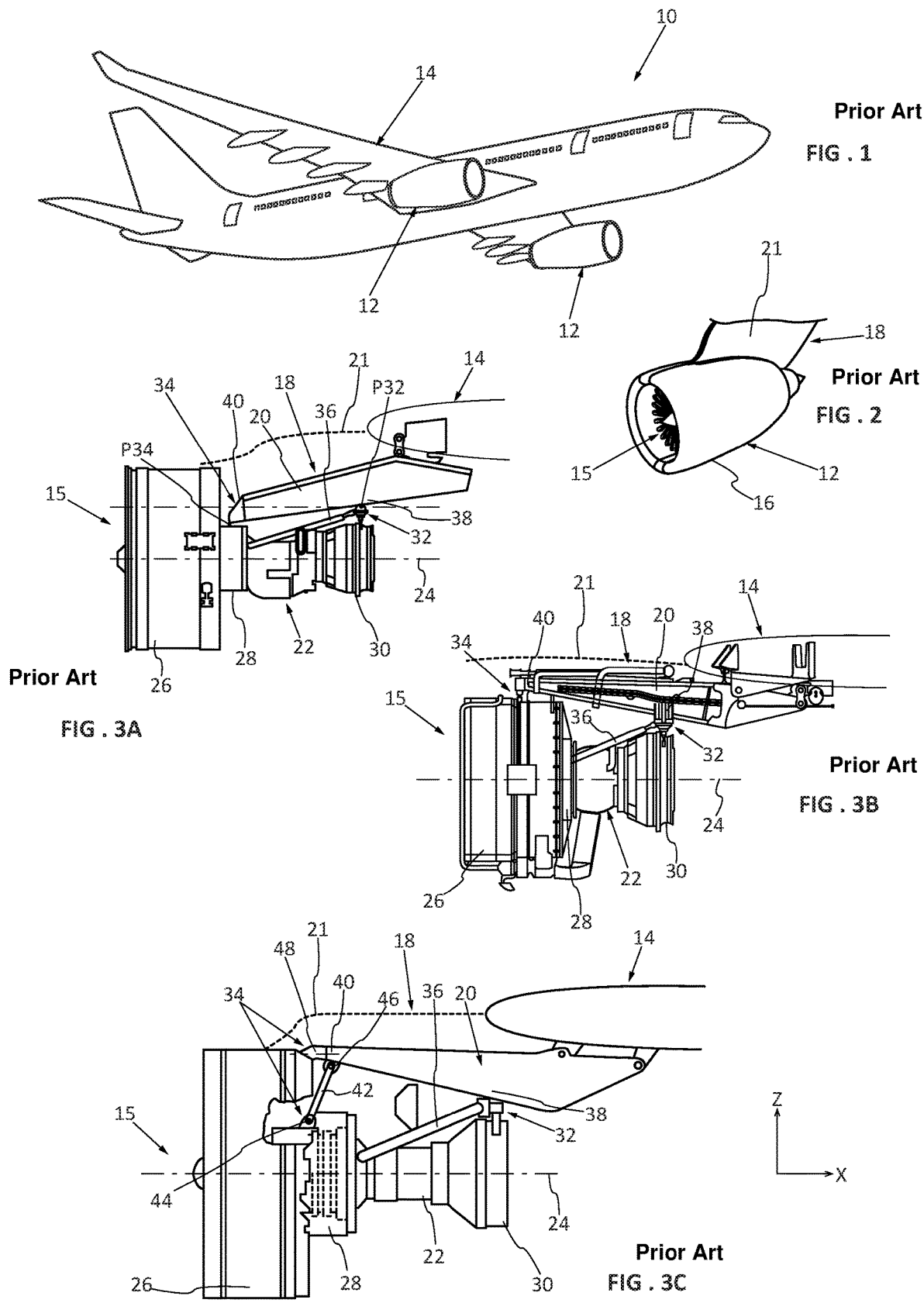

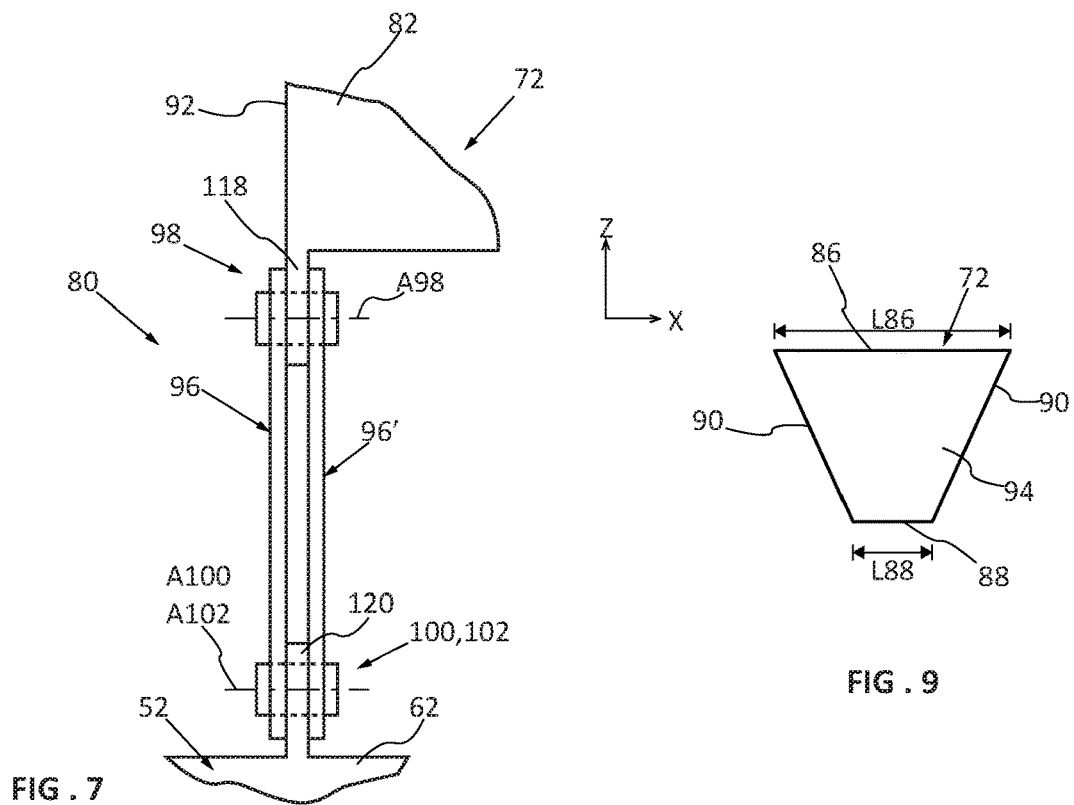
FIG. 7
FIG. 9
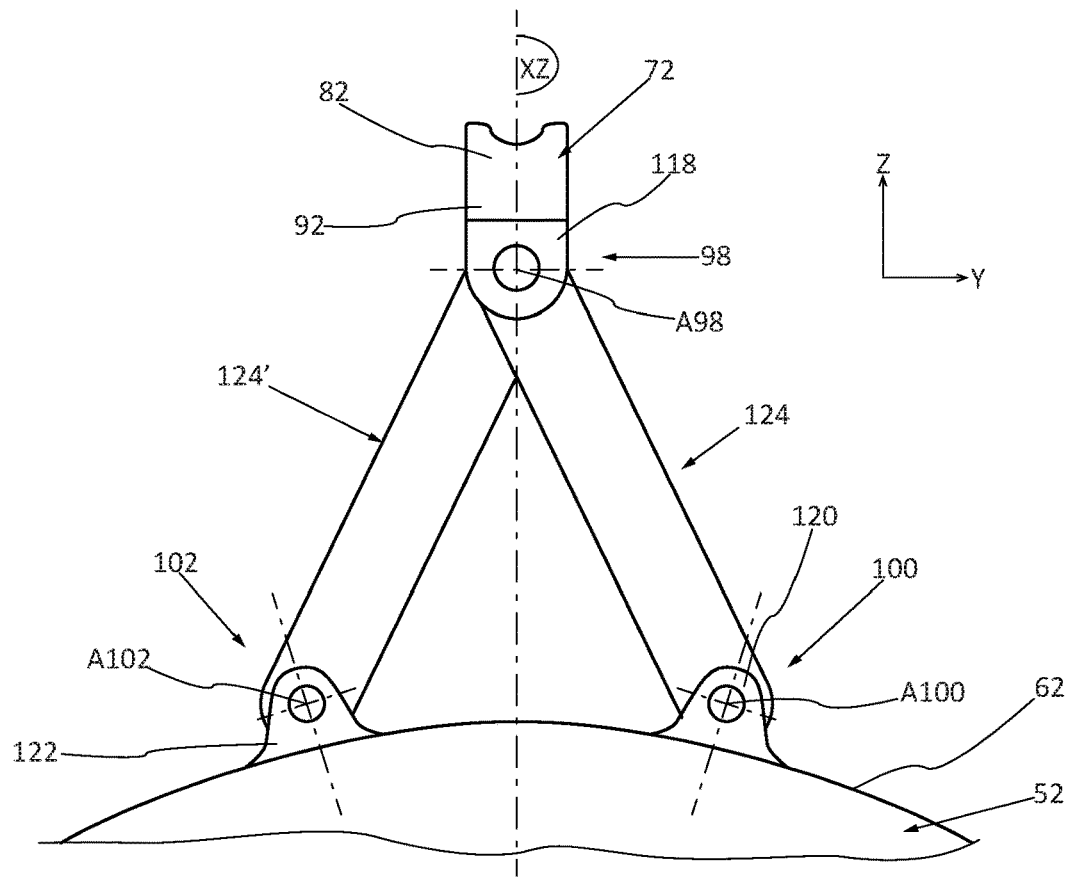
FIG. 8

AIRCRAFT ENGINE ASSEMBLY

CROSS-REFERENCES TO RELATED APPLICATIONS

This application claims the benefit of the French patent application No. 1759248 filed on Oct. 3, 2017, the entire disclosures of which are incorporated herein by way of reference.

BACKGROUND OF THE INVENTION

The present invention relates to an aircraft engine assembly.

As illustrated in FIGS. 1 and 2, an aircraft 10 comprises a number of engine assemblies 12 positioned under the wing 14 of the aircraft 10 in accordance with a configuration.

As illustrated in FIG. 2, an engine assembly 12 comprises an engine 15, a nacelle 16 positioned around the engine 15 and a pylon 18 linking the engine 15 and the remainder of the aircraft 10, in particular the wing 14.

As illustrated in FIGS. 3A, 3B and 3C, the pylon 18 comprises a rigid primary structure 20 that, inter alia, transmits forces between the engine 15 and the remainder of the aircraft 10, and a secondary structure 21 that encloses the primary structure 20 and limits pylon drag.

The present invention relates more particularly to aircraft engines of the dual-flow jet engine type. As illustrated in FIGS. 3A, 3B and 3C, this type of engine 15 comprises a core 22 that includes, in particular, a rotor pivoting relative to a stator on a rotation axis 24, and a fan casing 26 that has approximately a cylindrical form and in which a fan connected to the rotor of the core 22 of the engine is positioned.

According to one configuration, a longitudinal direction X merges with the rotation axis 24 of the engine 15, a horizontal transverse direction Y is horizontal and perpendicular to the rotation axis 24 of the engine 15, and a vertical transverse direction Z is vertical and perpendicular to the rotation axis 24 of the engine 15. A vertical longitudinal plane is vertical and contains the rotation axis 24 of the engine 15, a horizontal longitudinal plane is horizontal and contains the rotation axis 24 of the engine 15, and a transverse plane is perpendicular to the rotation axis 24 of the engine 15.

Throughout the description, the concepts of "front" and "rear" make reference to the direction of flow of the gases, "front" corresponding to the intake of gases (air) in the engine and "rear" corresponding to the exhaust of gases (combustion gases). Moreover, an intermediate part of an element corresponds to a part arranged between a front part and a rear part. The concepts of "top" and "bottom" make reference to the links between the pylon and the remainder of the aircraft, "top" corresponding to the link between the pylon and the aircraft wing and "bottom" corresponding to the link between the pylon and the engine.

The core 22 extends from a front casing 28 that comprises an air intake as far as a rear casing 30 that comprises a combustion gas exhaust.

According to one design, the primary structure 20 of the pylon 18 is connected to the engine 15 by a link that comprises a rear engine mount 32, a front engine mount 34 and a pair of push rods 36 that take up thrust forces.

According to a first variant illustrated in FIG. 3A and described in document FR-2.963.320, the rear engine mount 32 connects an intermediate part 38 of the primary structure 20 of the pylon 18 and the rear casing 30 of the core 22 of the engine 15, the front engine mount 34 directly connects the front end 40 of the primary structure 20 of the pylon 18 and the front casing 28 of the core 22 of the engine 15 and the push rods 36 connect the intermediate part 38 of the primary structure 20 and the front casing 28 of the core 22 of the engine. According to this first variant, the front link point P34 between the front engine mount 34 and the front end 40 of the primary structure 20 is arranged below a line D0 parallel to the rotation axis 24 of the engine 15, passing via the rear link point P32 between the rear engine mount 32 and the intermediate part 38 of the primary structure 20. Thus, the distance separating the rotation axis 24 of the engine 15 and the front link point P34 of the front engine mount 34 is smaller than that separating the rotation axis 24 of the engine 15 and the rear link point P32 of the rear engine mount 32.

According to a first drawback linked to this variant, the zone located between the core 22 of the engine and the primary structure 20 is reduced and does not allow the incorporation of supplementary equipment, such as a heat exchanger, into the engine. Such equipment is generally bulky and consequently positioned above the primary structure 20 of the pylon. This set-up leads to an increase in the volume of the secondary structure 21 and adversely affects aircraft drag.

According to a further drawback, the primary structure 20 is positioned close to the engine 15 and subject to high thermal stresses. Consequently, it is made from materials that withstand high temperatures such as, for example, titanium, which tends to increase the cost price and mass thereof.

Lastly, the front end 40 of the primary structure 20 is spaced apart from the nacelle, so it is necessary to provide complementary structures to support the nacelle, which gives rise to an increase in the mass and bulk of the pylon 18.

According to a second variant illustrated in FIG. 3B, the front engine mount 34 connects the front end 40 of the primary structure 20 of the pylon 18 and the fan casing 26. According to this second variant, the front end 40 of the primary structure 20 is positioned above the fan casing 26. This second variant leads to an increase in the zone located between the core 22 of the engine and the primary structure 20, which makes it possible to accommodate supplementary engine equipment therein. The primary structure 20 being at a distance from the core 22 of the engine, it is subject to less significant thermal stresses than in the case of the first variant. The primary structure 20 being closer to the nacelle than in the case of the first variant, the link between the primary structure 20 and the nacelle is simplified as compared with the first variant.

However, the front end 40 of the primary structure 20 being positioned above the fan casing 26, this second variant leads to a restriction of the diameter of the fan casing 26. In point of fact, this diameter tends to become ever greater owing to the increase in the bypass ratio of the new engines.

The location of the primary structure requires the secondary structure to have a very extensive aerodynamic form, which contributes to drag. According to a further drawback, this second variant complicates the design of the fan and of the fan casing, which are subject to significant stresses. In certain embodiments, this may also lead to a significant increase in the forces imposed on the rear engine mount 32 as compared with the first variant.

According to a third variant illustrated in FIG. 3C and described in document FR-3.040.369, the front end 40 of the primary structure is spaced apart from the core 22 of the engine 15 and the front engine mount 34 comprises:

a front rod 42, configured to ensure take-up of the forces on the axis Z, which has a first end, connected to the front casing 28 of the engine by a first, horizontal pivoting shaft 44 perpendicular to the rotation axis 24 of the engine 15, and a second end connected to the front end 40 of the primary structure 20 by a second, horizontal pivoting shaft 46 perpendicular to the rotation axis 24 of the engine 15, lateral rods 48, configured to ensure take-up of the forces on the axis Y, arranged on either side of the primary structure 20, which each have a first end, connected to the fan casing 26 by a first pivoting shaft parallel to the rotation axis 24 of the engine 15, and a second end connected to the front end 40 of the primary structure.

According to this third variant, the front end 40 of the primary structure 20 is offset rearwards relative to the fan casing 26.

This third variant offers the same advantages as those of the second variant. The front end 40 of the primary structure 20 no longer being positioned above the fan casing, this third variant does not limit the diameter of the fan casing 26. However, as in the case of the second variant, the third variant complicates the design of the fan and of the fan casing and leads to a significant increase in the forces imposed on the rear engine mount 32 as compared with the first variant. The rear part of the nacelle is thus wider, which may adversely affect aerodynamic performance.

Thus, the present invention aims to remedy all or some of the prior-art drawbacks.

SUMMARY OF THE INVENTION

To that end, a subject of the invention is an aircraft engine assembly, comprising an engine, a pylon and a nacelle, in which the engine is positioned, the engine comprising:
a core that comprises a rotor pivoting about a rotation axis, a front engine casing and a rear engine casing,
a fan positioned in a fan casing,
the pylon comprising a primary structure connected to the engine by an engine link that comprises:
a rear engine mount that connects an intermediate part of the primary structure and the core of the engine, the rear engine mount being connected to the intermediate part of the primary structure at a rear link point,
a front engine mount that connects a front end of the primary structure and the engine and that comprises at least one front rod that has at least three front link points, a first front link point configured in order to connect the front rod and the front end of the primary structure, a second front link point configured in order to connect the front rod and the core of the engine, and a third front link point configured in order to connect the front rod and the core of the engine, the second and third front link points being offset relative to one another in a horizontal direction perpendicular to the rotation axis of the engine,
at least two thrust rods.

According to the invention, the first front link point of the front engine mount and the rotation axis of the engine are separated by a distance greater than an exterior radius of the rear casing of the core of the engine at the rear link point of the rear engine mount.

The invention offers the following advantages:
the primary structure of the pylon is subject to less significant thermal stresses than in the case of the first variant of the prior art;
the fact that the separation of the front end of the primary structure and the core of the engine makes it possible to free up the volume between the primary structure and the core of the engine;

the front engine mount not being connected to the fan (because the front rod has three front link points, two front link points of which are connected to the engine offset in the transverse direction), makes it possible to simplify the design of the fan and leads to a considerable reduction in the stresses imposed on the rear engine mount as compared with the second and third variants of the prior art.

According to another feature, the first front link point of the front engine mount is positioned such that an upper edge of the front end of the primary structure is separated from the rotation axis of the engine by a distance smaller than the exterior radius of the fan.

According to a further feature, the first front link point of the front engine mount and the rotation axis of the engine are separated by a distance of between 0.45 and 0.70 times the exterior radius of the fan.

According to a further feature, the first front link point of the front engine mount is positioned below a lower edge of the front end of the primary structure.

According to one embodiment, the front engine mount comprises at least one front rod that has the form of a plate positioned in a plane perpendicular to a vertical longitudinal plane, which has a first elongate arm configured in order to be connected to at least one first tab integral with the front end of the primary structure at the first front link point, a second arm configured in order to be connected to at least one second tab integral with the front casing of the engine at the second front link point, and a third arm configured in order to be connected to at least one third tab integral with the front casing of the engine at the third front link point.

According to a further embodiment, the front engine mount comprises a first front rod, which has a first end configured in order to be connected to the front end of the primary structure at the first front link point and a second end configured in order to be connected to the front casing of the engine at the second front link point, and a second front rod that has a first end configured in order to be connected to the front end of the primary structure at the first front link point and a second end configured in order to be connected to the front casing of the engine at the third front link point.

According to a further particular feature, the primary structure of the pylon comprises a portion extending at least from the intermediate part as far as a rear end face and having a cross section in the form of an isosceles trapezium with a small base oriented towards the engine.

Thus, the aerodynamic profile of the nacelle makes it possible to reduce drag and aerodynamic volume. The rear nozzle forces are reduced, which makes it possible to reduce the rear of the caisson in order to improve aircraft performance.

The present application also relates to an aircraft that comprises at least one engine assembly according to the invention.

BRIEF DESCRIPTION OF THE DRAWINGS

Further features and advantages will become apparent from the following description of the invention, which is given solely by way of example with reference to the appended drawings, in which:
FIG. 1 is a perspective view of an aircraft,
FIG. 2 is a perspective view of an aircraft engine assembly,
FIG. 3A is a side view of an aircraft engine assembly, without nacelle, which illustrates a first variant of the prior art,
FIG. 3B is a side view of an aircraft engine assembly, without nacelle, which illustrates a second variant of the prior art,
FIG. 3C is a side view of an aircraft engine assembly, without nacelle, which illustrates a third variant of the prior art,
FIG. 7 is a side view of a front engine mount, which illustrates a second embodiment,
FIG. 8 is a front view of a front engine mount, which illustrates a third embodiment of the invention,
and FIG. 9 is a transverse section of a primary structure of an aircraft pylon, which illustrates one embodiment of the invention.

DETAILED DESCRIPTION OF THE PREFERRED EMBODIMENTS

Figure 4:
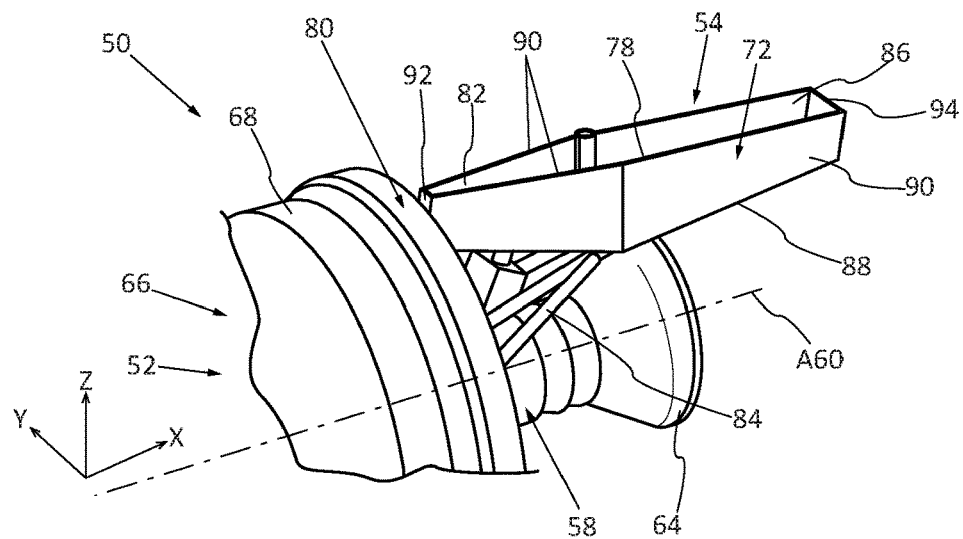
FIG. 4 is a perspective view of an aircraft engine assembly, without nacelle, which illustrates one embodiment of the invention.
Figure 5:
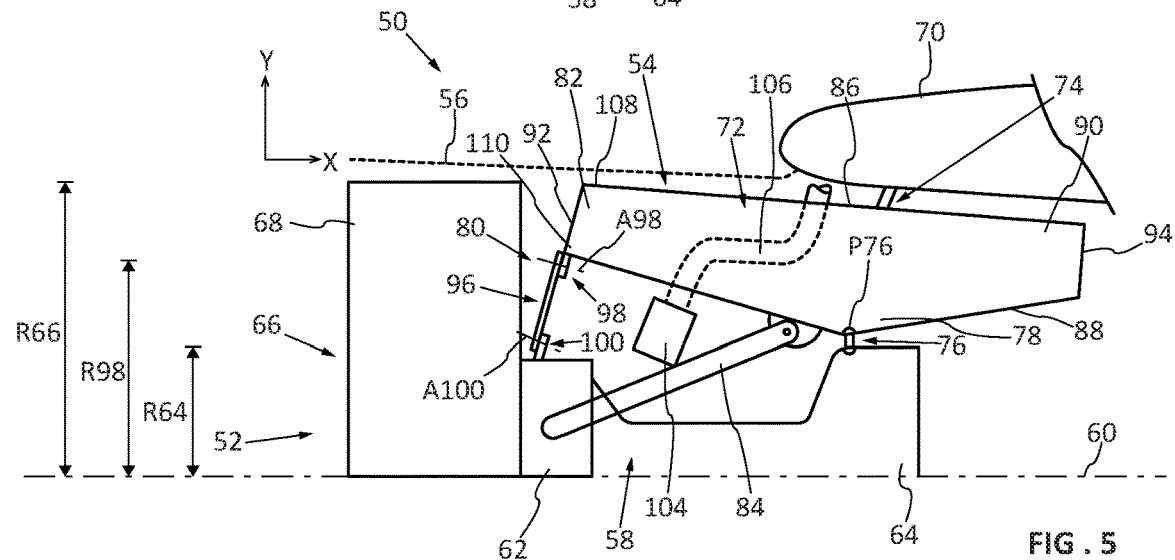
FIG. 5 is a side view of an aircraft engine assembly, without nacelle, which illustrates a first embodiment of the invention.

FIGS. 4 to 8 show, at 50, an engine assembly of an aircraft that comprises an engine 52, a pylon 54 and a nacelle 56 (partially shown in broken lines in FIG. 5).

According to one embodiment, the engine 52 is a dual-flow jet engine. It comprises:

a core 58 that comprises a rotor pivoting on a rotation axis 60 relative to a stator that includes a front casing 62 with an air intake and a rear casing 64 with an exhaust for combustion gases, a fan 66 connected to the rotor of the core 58 and positioned in a fan casing 68 connected to the front casing 62 by structural elements, such as radial arms.

The front 62, rear 64 and fan 68 casings are approximately concentric relative to the rotation axis 60.

The fan 66 has an exterior radius R66 (the largest radius of the fan casing 68).

In the remainder of the description, a longitudinal direction X merges with the rotation axis 60 of the engine 52, a horizontal transverse direction Y is horizontal and perpendicular to the rotation axis 60 of the engine 52 and a vertical transverse direction Z is vertical and perpendicular to the rotation axis 60 of the engine 52. A vertical longitudinal plane XZ is vertical and contains the rotation axis 60 of the engine 52, a horizontal longitudinal plane XY is horizontal and contains the rotation axis 60 of the engine 52, and a transverse plane is perpendicular to the rotation axis 60 of the engine 52.

The pylon 54 makes it possible to connect the engine assembly 50 to a wing 70, the engine assembly 50 being positioned under the wing 70.

The pylon 54 comprises a primary structure 72 positioned in a fairing (not shown) that confers aerodynamic characteristics on the pylon 54.

The primary structure 72 is connected to the wing 70 via a wing link 74 and connected to the engine 52 via an engine link.

According to one configuration, the engine link comprises a rear engine mount 76 that connects an intermediate part 78 of the primary structure 72 and the core 58 of the engine 52, more particularly the rear casing 64. The rear engine mount 76 is connected to the intermediate part 78 of the primary structure 72 at a rear link point P76.

The rear casing 64 of the core 58 of the engine 52 has an exterior diameter R64 at the rear link point P76.

The engine link also comprises a front engine mount 80 that connects a front end 82 of the primary structure 72 and the engine 52.

Lastly, the engine link also comprises at least two thrust rods 84 arranged symmetrically relative to the vertical longitudinal plane XZ and connecting the intermediate part 78 of the primary structure 72 and the core 58 of the engine 52, more particularly the front casing 62.

According to one embodiment, the primary structure 72 of the pylon has a caisson form and comprises an upper longitudinal member 86, a lower longitudinal member 88, two lateral walls 90, a front end wall 92, a rear end wall 94, and stiffeners. In a vertical longitudinal plane XZ, the lower longitudinal member 88 has a V form, the point of the V being oriented downwards and corresponding to the intermediate part 78 of the primary structure 72.

According to one embodiment, in top view, the lateral edges of the upper 86 and lower 88 longitudinal members are convergent forwards.

The front engine mount 80 is positioned at the front end of the lower longitudinal member 88.

According to one invention feature, the front end 82 of the primary structure 72 is offset in the longitudinal direction X towards the rear relative to the fan casing 68 and is not positioned above the fan casing 68. Thus, according to the invention, the diameter of the fan is not limited by the primary structure 72 of the pylon 54.

According to one embodiment, the front engine mount 80 comprises at least one front rod 96 that has at least three front link points, a first front link point 98, configured in order to connect the rod 96 and the front end 82 of the primary structure 72, a second front link point 100, configured in order to connect the front rod 96 and the core 58 of the engine 52, and a third front link point 102, configured in order to connect the front rod 96 and the core 58 of the engine 52, the second and third front link points 100 and 102 being offset relative to one another in the horizontal transverse direction Y.

This solution makes it possible for the core 58 of the front engine to take up the stresses in the horizontal transverse direction Y, which tends to minimize the forces transmitted between the primary structure 72 and the engine 52 at the rear engine mount 76.

According to the invention, the front engine mount 80 is not connected to the primary structure 72 of the pylon 54 and the fan casing 68. Thus, the fan casing 68 and the structural elements connecting it to the remainder of the engine do not take up the forces from the front engine mount 80.

Preferably, the second and third front link points 100 and 102 are symmetrical relative to the longitudinal and vertical plane XZ passing via the rotation axis 60 of the engine 52. This configuration allows a better distribution of forces.

The first front link point 98 comprises a link pivoting about a first pivoting axis A98 embodied as a cylindrical shaft.

The second front link point 100 comprises a link pivoting about a second pivoting axis A100 embodied as a cylindrical shaft.

The third front link point 102 comprises a link pivoting about a third pivoting axis A102 embodied as a cylindrical shaft.

According to one feature of the invention, the first front link point 98 of the front engine mount 80, which is connected to the front end 82 of the primary structure 72, and the rotation axis 60 of the engine 52 are separated by a distance R98 greater than the exterior radius R64 of the rear casing 64 of the core 58 of the engine 52 at the rear link point P76 of the rear engine mount 76.

According to the invention, the front end 82 of the primary structure 72 is separate from the core 58 of the engine 52. Thus, the primary structure 72 is subject to less significant thermal stresses than in the case of the first variant of the prior art and can, as a result, be produced from a material that is less dense and/or less expensive than titanium, which is generally used in the case of the first variant of the prior art.

According to a further advantage, separation of the front end 82 of the primary structure 72 of the core 58 of the engine 52 makes it possible to free up a volume between the primary structure 72 and the engine 52, making it possible to accommodate supplementary engine equipment such as, for example, a heat exchanger 104. The heat exchanger 104 being positioned under the primary structure 72, the flow of air 106 traversing said primary structure 72 is much cooler than when the heat exchanger is positioned above the primary structure 72, as in the case of the first variant of the prior art.

According to a further feature of the invention, the first front link point 98 of the front engine mount 80, which is connected to the front end 82 of the primary structure 72, is positioned such that the upper edge 108 of the front end 82 of the primary structure 72, which corresponds to the highest part of the primary structure, is separated from the rotation axis 60 of the engine 50 by a distance smaller than the exterior radius R66 of the fan 66.

This configuration makes it possible not to create stresses on the optimized aerodynamic lines of the nacelle 56.

According to a further feature of the invention, the first front link point 98 of the front engine mount 80, which is connected to the front end 82 of the primary structure 72, and the rotation axis 60 of the engine 50 are separated by a distance R98 of between 0.45 and 0.70 times the exterior radius R66 of the fan 66.

According to a further feature, the first front link point 98 of the front engine mount 80, which is connected to the front end 82 of the primary structure 72, is positioned below the lower edge 110 of the front end 82 of the primary structure 72.

Irrespective of the embodiment, the vertical position of the first front link point 98 of the front engine mount 80 is close to optimum, which makes it possible to minimize the forces transmitted between the primary structure 72 and the engine 52 at the rear engine mount 76.

Figure 6:
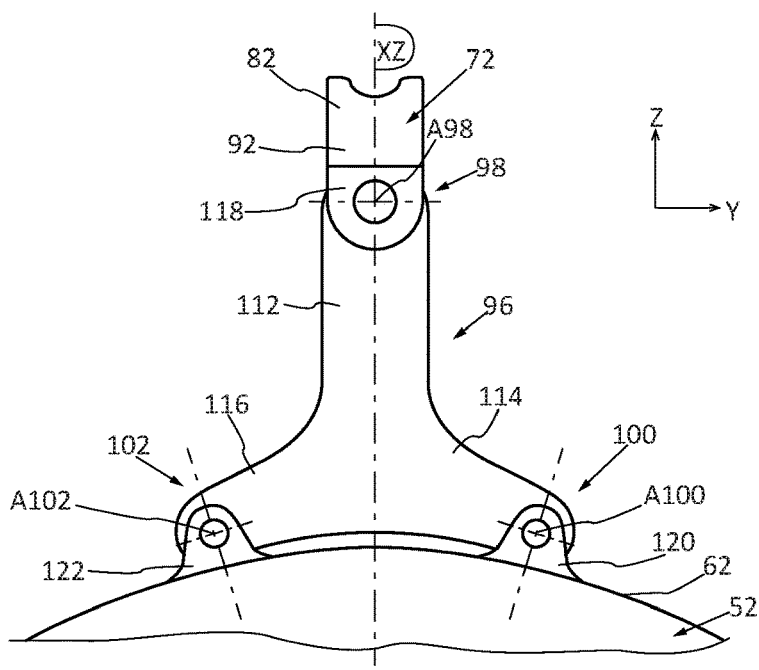
FIG. 6 is a front view of the front engine mount visible in FIG. 5.

According to a first embodiment that can be seen in FIGS. 5 and 6, the front engine mount 80 comprises a single front rod 96 connected, on the one hand, to the front end 82 of the primary structure 72 at the first front link point 98 and, on the other, to the front casing 62 of the engine 52 at the second and third front link points 100 and 102.

The front rod 96 is in the form of a plate, positioned in a plane perpendicular to the vertical longitudinal median plane XZ, which has a first elongate arm 112 configured in order to be connected to the front end 82 of the primary structure 72 and also second and third arms 114, 116 configured in order to be connected to the front casing 62 of the engine 52 at the second and third front link points 100 and 102.

The front end 82 of the primary structure 72 comprises at least a first tab 118 arranged in the extension of the front wall 92, under the primary structure 72. In one configuration, the front end 82 of the primary structure 72 comprises two first tabs 118 that are parallel with one another and parallel to the plane forming the front rod 96, which form a fitting for receiving the first elongate arm 112 of the front rod 96.

In the case of the second front link point 100, the front casing 62 of the engine 52 comprises at least one second tab 120 parallel to the plate forming the front rod 96. According to one configuration, the front casing 62 of the engine 52 comprises two second tabs 120 that are parallel with one another such as to form a fitting for receiving the second arm 114 of the front rod 96.

In the case of the third front link point 102, the front casing 62 of the engine 52 comprises at least one third tab 122 parallel to the plate forming the front rod 96. According to one configuration, the front casing 62 of the engine 52 comprises two third tabs 122 that are parallel with one another such as to form a fitting for receiving the third arm 116 of the front rod 96.

According to a second embodiment that can be seen in FIG. 7, the front engine mount 80 comprises at least two front rods 96, 96' identical to those of the first embodiment. These two front rods 96, 96' are spaced apart to allow the insertion between them of a first tab 118, integral with the primary structure 72, and second and third tabs 120 and 122 integral with the front casing 62 of the engine 52.

According to a third embodiment that can be seen in FIG. 8, the front engine mount 80 comprises two front rods 124, 124', a first front rod 124 that has a first end configured in order to be connected to the front end 82 of the primary structure 72 at the first front link point 98 and a second end configured in order to be connected to the front casing 62 of the engine at the second front link point 100 and a second front rod 124' that has a first end configured in order to be connected to the front end 82 of the primary structure 72 at the first front link point 98 and a second end configured in order to be connected to the front casing 62 of the engine at the third front link point 102.

According to this third embodiment, the front end 82 of the primary structure 72 comprises at least one first tab 118 for the first front link point 98 and the front casing 62 of the engine 52 comprises at least one second tab 120 for the second front link point 100 and at least one third tab 122 for the third front link point 102.

According to a further feature of the invention, reduction of the forces transmitted between the primary structure 72 and the engine 52 at the rear engine mount 76 makes it possible to reduce the width of the rear part of the primary structure 72 connected by the rear engine mount 76 to the engine 52.

According to one embodiment that can be seen in FIG. 9, the primary structure 72 of the pylon comprises a portion extending at least from the intermediate part 78 as far as a rear end face 94 and having a traverse section in the form of an isosceles trapezium with a small base oriented towards the engine 52. Thus, the lower longitudinal member 88 has a width L88 (dimension taken in the horizontal transverse direction Y) smaller than the width L86 of the upper longitudinal member 86. The width L88 of the lower longitudinal member 88 is smaller than half the width L86 of the upper longitudinal member 86.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft engine assembly, comprising an engine, a pylon and a nacelle, in which the engine is positioned, the engine comprising:
    a core that comprises a rotor pivoting about a rotation axis, a front engine casing and a rear engine casing,
    a fan positioned in a fan casing that has an exterior radius,
    the pylon comprising a primary structure connected to the engine by an engine link that comprises:
        a rear engine mount that connects an intermediate part of the primary structure and the rear engine casing, the rear engine mount connecting the intermediate part of the primary structure at a rear link point,
        a front engine mount that connects a front end of the primary structure and the front engine casing and that comprises at least one front rod that has at least three front link points, a first front link point configured in order to connect the front rod and the front end of the primary structure, a second front link point configured in order to connect the front rod and the core of the engine, and a third front link point configured in order to connect the front rod and the core of the engine, wherein the second and third front link points are offset relative to one another in a horizontal direction perpendicular to the rotation axis of the engine,
        at least two thrust rods that connect the intermediate part of the primary structure and the front engine casing,
        wherein the first front link point of the front engine mount and the rotation axis of the engine are separated by a distance greater than an exterior radius of the rear casing of the core of the engine at a rear link point of the rear engine mount,
    the first front link point of the front engine mount is positioned such that an uppermost edge of the front end of the primary structure is separated from the rotation axis of the engine by a distance smaller than the exterior radius of the fan.

2. The aircraft engine assembly according to claim 1, wherein the first front link point of the front engine mount and the rotation axis of the engine are separated by a distance of between 0.45 and 0.70 times the exterior radius of the fan.

3. The aircraft engine assembly according to claim 1, wherein the first front link point of the front engine mount is positioned below a lower edge of the front end of the primary structure.

4. The aircraft engine assembly according to claim 1, wherein the front engine mount comprises at least one front rod having a form of a plate positioned in a plane perpendicular to a vertical longitudinal plane passing via the rotation axis of the engine, which has a first elongate arm configured to connect at least one first tab integral with the front end of the primary structure at the first front link point, a second arm configured to connect at least one second tab integral with the front casing of the engine at the second front link point, and a third arm configured to connect at least one third tab integral with the front casing of the engine at the third front link point.

5. The aircraft engine assembly according to claim 1, wherein the primary structure of the pylon comprises a portion extending at least from the intermediate part as far as a rear end face and having a cross section in a form of an isosceles trapezium with a small base oriented towards the engine.

6. An aircraft comprising at least one engine assembly according to claim 1.

* * * * *